US008681150B2

(12) United States Patent
Kim et al.

(10) Patent No.: US 8,681,150 B2
(45) Date of Patent: Mar. 25, 2014

(54) METHOD, MEDIUM, AND SYSTEM WITH 3 DIMENSIONAL OBJECT MODELING USING MULTIPLE VIEW POINTS

(75) Inventors: Keun-ho Kim, Seoul (KR); Hui Zhang, Yongin-si (KR); Do-kyoon Kim, Seongnam-si (KR); Seok-yoon Jung, Seoul (KR); Anton Konouchine, Moscow (RU); Vladimir Vezhnevets, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 1271 days.

(21) Appl. No.: 12/010,440

(22) Filed: Jan. 24, 2008

(65) Prior Publication Data

US 2008/0211809 A1    Sep. 4, 2008

(30) Foreign Application Priority Data

Feb. 16, 2007  (KR) .................. 10-2007-0016782

(51) Int. Cl.
 *G06T 17/00*   (2006.01)
(52) U.S. Cl.
 USPC .......................................... 345/420; 345/630
(58) Field of Classification Search
 USPC ................................................. 345/420, 630
 See application file for complete search history.

(56) References Cited

U.S. PATENT DOCUMENTS

| 6,025,847 | A | 2/2000 | Marks | |
| 6,975,755 | B1 * | 12/2005 | Baumberg | 382/154 |
| 2006/0120590 | A1 * | 6/2006 | Han et al. | 382/154 |

FOREIGN PATENT DOCUMENTS

| JP | 7-234949 | 9/1995 |
| KR | 2001-0107403 | 12/2001 |
| KR | 10-2004-0022100 | 3/2004 |

OTHER PUBLICATIONS

Soon-Yong Park et al. "Pose Estimation and Integration for Complete 3D Model Reconstruction" Proceedings of the Sixth IEEE Workshop on Applications of Computer Vision 2002.*
Paul E. Debevec et al. "Modeling and Rendering Architecture from Photographs: A hybrid geometry- and image-based approach" Technical Report UCB//CSD-96-893, Jan. 1996.*
Soon-Yong Park et al. "Automatic 3D Model Reconstruction using Voxel Coding and Pose Integration" Department of Electrical and Computer Engineering, IEEE 2002.*
Softcube Co., Ltd., "Photo3D 3D model with texture from photo", <http://www.softcube.co.jp/productinfo/photo3d_eg/eindex.html>, 7 pp, 2006.
Marta Wilczkowiak et al., "Using Geometric Constraints through Parallelepipeds for Calibration and 3D Modeling", IEEE Transactions on Pattern Analysis and Machine Intelligence, vol. 27, No. 2, Feb. 2005, pp. 194-207.
Byong Mok Oh et al., "Image-Based Modeling and Photo Editing", Laboratory for Computer Science Massachusetts Institute of Technology, ACM SIGGRAPH 2001, Aug. 12-17, 2001, pp. 433-442.
A. Criminisi et al., "Single View Metrology", Department of Engineering Science University of Oxford, International Journal of Computer Vision, 2000, vol. 40, Issue 2, pp. 123-148.

* cited by examiner

*Primary Examiner* — Maurice L McDowell, Jr.
(74) *Attorney, Agent, or Firm* — Staas & Halsey LLP

(57) ABSTRACT

A modeling method, medium, and system. The modeling method may include specifying an object in a plurality of 2 dimensional (2D) images expressed from different view points, considering an edge and contents of each component of each 2D image, generating a 3 dimensional (3D) model of each specified object, and matching the generated 3D models considering relative locations of each generated 3D model. Accordingly, a realistic 3D model of an object expressed in an image can be accurately generated.

44 Claims, 5 Drawing Sheets

METHOD, MEDIUM, AND SYSTEM WITH 3 DIMENSIONAL OBJECT MODELING USING MULTIPLE VIEW POINTS

CROSS-REFERENCE TO RELATED APPLICATIONS

This application claims the benefit of Korean Patent Application No. 10-2007-0016782, filed on Feb. 16, 2007, in the Korean Intellectual Property Office, the disclosure of which is incorporated herein in its entirety by reference.

BACKGROUND

1. Field of the Invention

One or more embodiments of the present invention relates to modeling, and more particularly, to a modeling method, medium, and system including modeling of an object or a modeled object, expressed in a 2 dimensional (2D) image, as a 3 dimensional (3D) object.

2. Description of the Related Art

Modeling techniques that generate a 3 dimensional (3D) model from a 2 dimensional (2D) image, such as a digital photograph, have recently come into the spotlight. As will be explained, modeling discussed herein may ensure quicker modeling operations compared to conventional modeling techniques, where most modeling depends on the manual work of a skilled designer.

Accordingly, as will be explained herein, and as observed by the inventors of the present invention, the inventors have found that a method of accurately generating a realistic 3D model of an object expressed in a 2 dimensional image is desirable. In detail, as a method of generating a realistic 3D model, a method of generating a 3D model having information from various visual points using a plurality of 2D images each having information from one visual point of an object is desired. Further, the inventors found that, as a method of generating an accurate 3D model, a method of accurately specifying an object in a 2D image is also desired. One or more embodiments of the present invention may, thus, accomplish such goals.

SUMMARY

One or more embodiments of the present invention provides a modeling method, medium, and system accurately generating a realistic 3 dimensional (3D) model of an object expressed in a 2 dimensional (2D) image.

Additional aspects and/or advantages will be set forth in part in the description which follows and, in part, will be apparent from the description, or may be learned by practice of the invention.

To achieve the above and/or other aspects and advantages, embodiments of the present invention include a modeling method including combining at least two respective 3D models from at least two different view points representing separate and/or overlapping portions of a same identified object, represented by each 3D model, placing an image including the identified object over the combined 3D models, and outputting a corresponding resultant 3D model with the overplaced image.

To achieve the above and/or other aspects and advantages, embodiments of the present invention include a modeling method generating a 3D model for a 2D object, including comparing a first image of a first view point including the object and a second image of a second view point including the object, modifying the first image to include a portion of the second image, with reference to the object in the second image, through modification of the portion of the second image for insertion into the first image to replace a corresponding portion of the first image, and placing the modified first image over a 3D model corresponding to the object.

To achieve the above and/or other aspects and advantages, embodiments of the present invention include a modeling method, including identifying an object present in at least a first image of a first view point by comparing analyzed edges and/or contents of components of the first image with pre-defined edge and/or content information of pre-defined objects, generating a 3D model based upon results of the comparing of the analyzed edges and/or contents of components, and placing the first image over the generated 3D model.

To achieve the above and/or other aspects and advantages, embodiments of the present invention include a modeling system, including a model matching unit to combine at least two identified respective 3D models from at least two different view points representing separate and/or overlapping portions of a same identified object, represented by each 3D model, and an arranging unit to place an image including the identified object over the combined 3D models.

To achieve the above and/or other aspects and advantages, embodiments of the present invention include a modeling system generating a 3D model for a 2D object, including a model generator to compare a first image of a first view point including the object and a second image of a second view point including the object, modifying the first image to include a portion of the second image, with reference to the object in the second image, through modification of the portion of the second image for insertion into the first image to replace a corresponding portion of the first image, and an arranging unit to place the modified first image over a 3D model corresponding to the object.

To achieve the above and/or other aspects and advantages, embodiments of the present invention include a modeling method, including an object identification unit to identify an object present in at least a first image of a first view point by comparing analyzed edges and/or contents of components of the first image with predefined edge and/or content information of pre-defined objects, a model generator to generate a 3D model based upon results of the comparing of the analyzed edges and/or contents of components, and an arranging unit to place the first image over the generated 3D model.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
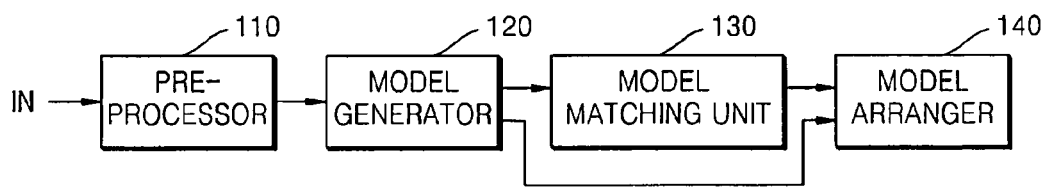
FIG. 1 illustrates a modeling system, according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a modeling system, according to an embodiment of the present invention. The modeling system may include a pre-processor 110, a model generator 120, a model matching unit 130, and a model arranger 140, for example.

The pre-processor 110 may specify an object that is to be modeled from a 2 dimensional (2D) image, for example, such as received through an input terminal IN. Here, such a 2D image may be a 2D realistic image, such as a digital photograph, and the object within the image may be a subject, such as a building or a car. Such a 2D image may further be read from a memory (not shown), for example.

The pre-processor 110 may, thus, receive the example 2D image expressing at least one object, and attempt to specify one or more objects in the 2D image, e.g., all the identifiable objects. In addition, the pre-processor 110 may receive a plurality of such 2D images, potentially expressed from various view points, and specify an object from each 2D image. For example, when a photographer photographs at least a part from among buildings A, B, C, D, and E arranged in a row from various locations, five 2D images may be generated, e.g., a photograph of the buildings A and B, a photograph of the buildings A, B, and C, a photograph of the buildings B, C, and D, a photograph of the buildings C, D, and E, and a photograph of the buildings D and E. The pre-processor 110 may, thus, specify each object expressed on the each generated 2D image.

In order to accurately model an object expressed in such a 2D image, the object may preferably be accurately specified in the 2D image. For example, in the case where a 2D image expresses a road, a plurality of cars on the road, and a plurality of buildings closely standing in a row on both sides of the road, assuming in this case the road, each car, or each building cannot be accurately specified but instead a plurality of buildings are specified together as one building or a car photographed with a building is specified as a part of the building, a 3 dimensional (3D) model of the inaccurately specified building may not be accurately generated. Thus, in order to more accurately specify an object, the pre-processor may operate as follows.

The pre-processor 110 may specify an object in the 2D image based on entire edges and contents of each component of the 2D image. In greater detail, the pre-processor 110 may correlate such aspects of the 2D image and pre-prepared object(s) based on at least one edge and contents of each component of the pre-prepared object(s), e.g., stored in a database (not shown). Here, this database may store information about at least one edge and contents of each component of each of a plurality of objects, for example.

The edge means an identifiable line of the object, and a boundary line of the object is a type of edge. When the object is a building, not only a boundary line of the building but also a line showing a frame of a window of the building may be the edge of the object. When an object K is expressed in a 2D image, that is, when edges of the 2D image include characteristic edges of the object K, the pre-processor 110 may analyze the example database in order to recognize the characteristic edges of the object K and specify an image having the recognized edges from the 2D image as the object K. As described in the above embodiment, in order for the pre-processor 110 to specify the object K from the 2D image considering the edges of the 2D image, information, for defining edges of the object K, may be pre-prepared in the database from various view points and depths. Here, the depth means a distance between a view point and a 3D model of the object K.

Meanwhile, the contents of each component may include color information, texture information, 2D location information, 3D geometry information, etc., for example That is, contents about a color component, contents about a texture component, contents about a 2D location component, and contents about a 3D geometry component of a 2D image are examples of the contents of each component of the 2D image. Here, the texture information is information about the feel of a material, the 2D location information is information about a location of an object in the 2D image, and the 3D geometry information is information about an orientation of an object in the 2D image. As described above, when an object expressed in a 2D image is a result of a 3D model reflected onto a 2D plane, boundaries which are parallel to each other from among boundaries of each surface of the 3D model may be reflected onto lines crossing at one common point. Hereinafter, this common point is referred to as a vanishing point. In addition, the vanishing point corresponds to a surface of an object, and in detail, geometry information of a surface of an object corresponding to the vanishing point is determined according to geometry information of edge extension lines converged at the vanishing point. The orientation may be geometry information of each surface of an object. When the example image, as the 2D image expressing an object, is a 2D realistic image, such as a digital photograph, the 2D image has at least one vanishing point, and 3D geometry information of the 2D image can be recognized by the pre-processor 110 detecting the vanishing point of the 2D image.

When the object K is expressed in a 2D image, that is, when characteristic color information of the object K is included in color information of the 2D image, the pre-processor 110 may analyze the database, for example, in order to determine the characteristic color information of the object K, and specify a corresponding image having the determined color information from among the 2D image as the object K. Accordingly, in this example, in order for the pre-processor 110 to specify the object K in the 2D image considering the color information of the 2D image, the color information of the object K may be stored in the database from various view points and depths.

Similarly, when the object K is expressed in a 2D image, that is, when characteristic texture information of the object K is included in texture information of the 2D image, the pre-processor 110 may analyze the database in order to determine the characteristic texture information of the object K and specify a corresponding image having the determined texture information from among the 2D image as the object K. Accordingly, in this example, in order for the pre-processor 110 to specify the object K in the 2D image considering the texture information of the 2D image, the texture information of the object K may be stored in the database from various view points and depths.

Further, when the object K is expressed in a 2D image, that is, when characteristic 2D location information of the object K is included in 2D location information of the 2D image, the pre-processor 110 may analyze the database in order to determine the characteristic 2D location information of the object K and specify a corresponding image having the determined 2D location information from among the 2D image as the object K. Accordingly, in this example, in order for the pre-processor 110 to specify the object K in the 2D image considering the 2D location information of the 2D image, the 2D location information of the object K may be stored in the database from various view points and depths.

Similarly, when the object K is expressed in a 2D image, that is, when characteristic 3D geometry information of the object K is included in 3D geometry information of the 2D image, the pre-processor 110 may analyze the database in order to determine the characteristic 3D geometry information of the object K and specify a corresponding image having the determined 3D geometry information from among the 2D image as the object K. Accordingly, in this example, in order for the pre-processor 110 to specify the object K in the 2D image considering the 3D geometry information of the 2D image, the 3D geometry information of the object K may be stored in the database from various view points and depths.

As described in the above examples, noting again that alternatives are further available, while specifying an object in a 2D image, the pre-processor 110 may consider edges of the 2D image, color information of the 2D image, texture information of the 2D image, 2D location information of the 2D image, or 3D geometry information of the 2D image, for example. As an alternative, for example, at least one of edges, color information, texture information, 2D location information, and 3D geometry information of different objects may be the same. Accordingly, in order for the pre-processor 110 to accurately specify the object in the 2D image, entire edges and contents of each components of the 2D image, such as edges, color information, texture information, 2D location information, and 3D geometry information of the 2D image may be considered. For example, in an example, when a 2D image expresses objects K, L, M, and N, wherein the objects K, L, and N are buildings disposed at predetermined distances and having different shapes, where the objects K and L are gray buildings, the object N is a blue building, and the object M is a gray car passing in front of the object K, the pre-processor 110 may specify an object considering only color information of the 2D image and specify/classify the objects K, L, M, and N as two objects, i.e., the objects K, L, and M, and the object N. However, the pre-processor 110 may also consider 2D location information of the 2D image, and thus recognize that at least two gray objects exist in the 2D image and specify the objects K, L, and M as two objects, i.e., the objects K and M and the object L. In addition, the pre-processor 110 may consider texture information of the 2D image and thus classify and specify the objects N and sky. Moreover, the pre-processor 110 may consider edges of the 2D image, and classify/specify the object K and object M. Accordingly, the pre-processor 110 may accurately specify each of the objects K, L, M, and N.

Meanwhile, an object in the 2D image, e.g., as input to the pre-processor 110, may be perpendicular to a pre-prescribed horizontal line in the 2D image. Accordingly, when a boundary line on the horizontal line from among boundaries of the object input to the pre-processor 110 is not perpendicular, the pre-processor 110 may process the 2D image so that the boundary line is perpendicular to the horizontal line before specifying the object in the 2D image.

The model generator 120 may further perform modeling on the object specified in the pre-processor 110. In detail, the model generator 120 may generate a 3D model in a 3D space corresponding to the object specified in the pre-processor 110. In more detail, the model generator 120 may calculate a depth value of each pixel forming the specified object, generate the 3D form of the specified object in the 3D space considering the calculated depth values and locations of the pixels forming the specified object in the 2D image, and put the 2D image of the specified object obtained from the specified object over the generated 3D form. Accordingly, as the 2D image is put over the 3D form, the 3D mode having the color and texture information on the surface may be obtained.

However, if a wrong 2D image is put over the 3D form of the specified object, e.g., because a 2D image of another object is treated as a part of the 2D image of the specified object as the other object overlaps with a part of the specified object, the model generator 120 may change an image of a certain region of the specified object expressed from a certain view point using an image corresponding to the image of the certain region from among an image of the specified object expressed from another view point, and put the image of the specified object over the 3D form of the specified object. Accordingly, the model generator 120 may accurately generate color and texture of the 3D model of the specified object even when the other object overlaps with part of the specified object.

A 3D model generated by the model generator 120 based on a 2D image may, thus, be a 3D model having information from only one view point.

Due to the fact that the modeled 3D model may be viewed from various view points, a 3D model having information from only one view point may be an unrealistic model. Accordingly, a method of generating a 3D model having information from various view points, that is, a method of generating a realistic 3D model, may be provided. Consequently, the modeling apparatus according to the current embodiment may include a model matching unit 130.

The model matching unit 130 may match a 3D model of an object expressed from a view point and a 3D model of the object expressed from another view point considering relative locations between the 3D model of the object expressed from the view point and the 3D model of the object expressed from the other view point. In detail, the model matching unit 130 may reconstruct generated 3D models of a object as one 3D model by considering a relative location of the generated 3D model of the object specified in a 2D image from a certain view point with respect to the generated 3D model of the object specified in a 2D image from another view point. Accordingly, a 3D model having information from various view points, instead of just the 3D model having information from only one view point, may be generated.

The model arranger 140 may further arrange the 3D model received from the model generator 120 and/or the model matching unit 130 in a 3D space. Here, the 3D model received from the model generator 120 may be a 3D model generated based only on a 2D image expressed from a certain view point, and the 3D model received from the model matching unit 130 may be a 3D model generated based on 2D images expressed from various view points.

The model arranger 140 may arrange the generated 3D models in the 3D space so that relative locations between the specified objects in the 2D image become relative locations between the generated 3D models of the specified objects in the 2D image. Accordingly, when there are various objects in the 2D image that are to be modeled, the model arranger 140 may easily and quickly arrange, e.g., merge, various 3D models in the 3D space, which are the various 3D models generated based on the 2D image, because when a location of one 3D model of the objects that are to be modeled is determined in the 3D space, locations of the remaining 3D models may be automatically determined.

Figure 2:
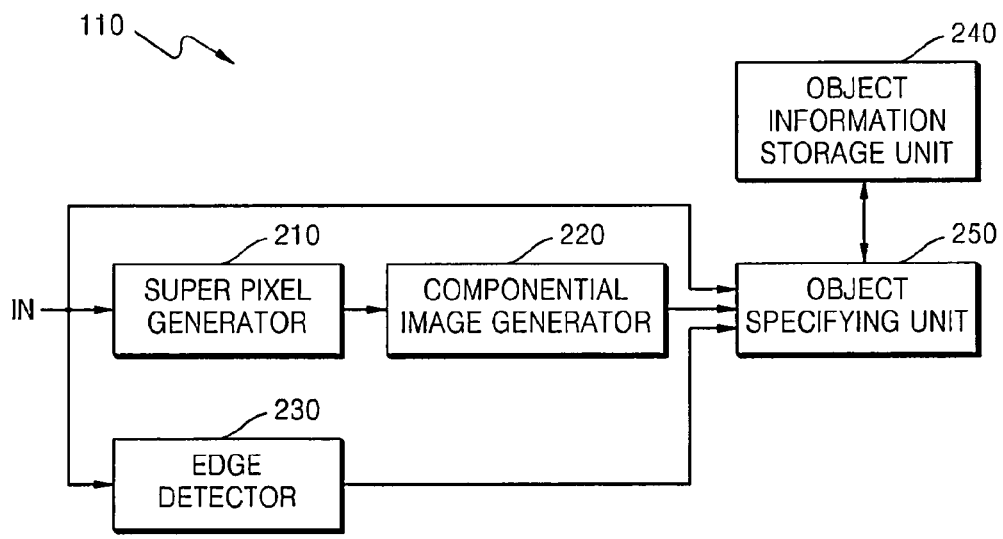
FIG. 2 illustrates a pre-processor, such as that illustrated in FIG. 1, according to an embodiment of the present invention.

FIG. 2 is a block diagram illustrating a pre-processor 110, such as that illustrated in FIG. 1, according to an embodiment of the present invention. The pre-processor 110 may include a super pixel generator 210, a componential image generator 220, an edge detector 230, an object information storage unit 240, and an object specifying unit 250, for example.

The super pixel generator 210 may generate a plurality of groups (hereinafter, referred to as super pixels) of pixels of the input image, whereby there is a preset similarity between the pixels, e.g., by dividing the 2D image received through the input terminal IN.

The componential image generator 220 may generate a plurality of images, each image having contents pertaining to only a certain component, by expressing the 2D image, formed of the super pixels, in each component. For example, the componential image generator 220 may generate an example total of four 2D images using the 2D image formed of the super pixels, by generating a 2D image having only color components by only expressing the color components of the 2D image formed of the super pixels, generating a 2D image having only texture components by only expressing the texture components of the 2D image formed of the super pixels, generating a 2D image having only 2D location components by only expressing the 2D location components of the 2D image formed of the super pixels, and generating a 2D image having only 3D geometry components by only expressing the 3D geometry components of the 2D image formed of the super pixels, for example.

As illustrated in FIG. 2, when the pre-processor 110 includes such a super pixel generator 210, the componential image generator 220 may generate a plurality of images, each image having contents pertaining to a certain component, by expressing the 2D image, having a plurality of super pixels, by each component. For example, when super pixels, forming a 2D image, having color information, where each pixel is expressed in red, green, and blue (RGB) values, are to be expressed only in color components, the componential image generator 220 may change each pixel value of the pixels forming each super pixel into an average value of RGB values of the pixels forming the super pixels.

However, if such a super pixel generator 210 is not included in the pre-processor 110, the componential image generator 220 may generate a plurality of images, each image having contents pertaining to a certain component, by expressing the 2D image, received through the input terminal IN, by each component.

The edge detector 230 may further detect continuously located pixels, each of which change of image information (for example, luminous intensity) in the 2D image received through the input terminal IN is above a preset threshold value in the 2D image, as one edge. For example, the edge detector 230 may detect a boundary of a concrete surface of a building and a window, corresponding to points in which luminous change is above a predetermined level, as an edge of an object, which is the building having several windows. As such, the edge detector 230 may detect a plurality of edges in the 2D image.

The object information storage unit 240 may store information about at least one edge and contents of each component of each of a plurality of objects. Here, the object information storage unit 240 may store as much information of corresponding objects as possible, and the information may preferably be from various view points and depths. The above-described database may be considered similar to the object information storage unit 240.

The object specifying unit 250 may further specify an image, having edges and contents of each component of an object, shown by the information stored in the object information storage unit 240, from among a 2D image received through the input terminal IN as the object.

Figure 3:
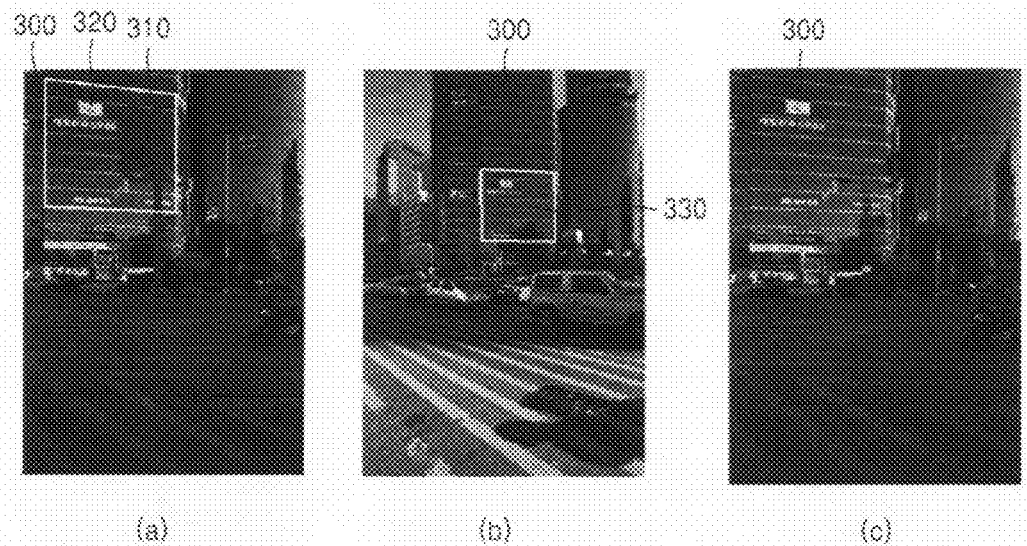
FIG. 3 illustrates, in illustrations (a)-(c), operations of a model generator, such as the model generator illustrated in FIG. 1, according to an embodiment of the present invention.

FIG. 3 illustrates, in illustrations (a)-(c), operations of the model generator 120, such as that illustrated in FIG. 1, according to an embodiment of the present invention.

Illustration (a) of FIG. 3 shows a 2D image from a certain view point and illustration (b) of FIG. 3 shows a 2D image from another view point. In illustration (a) of FIG. 3, the object 310 overlaps a part of the shown object 300, while in illustration (b) of FIG. 3, nothing overlaps the shown object 300.

As illustrated in illustration (a) of FIG. 3, where part of the object 300 is overlapped by the object 310, an image of the object 310 may be treated as a part of an image of the object 300. Accordingly, parts of color and texture of a 3D model generated by modeling the object 300 may include color and texture of the object 310.

In this case, before the object 300 is put over a 3D form, an image of the part in which the object 300 and the object 310 overlap may be changed to an image of a part in which the object 310 does not overlap the object 300.

Accordingly, the model generator 120 can change an image of a certain area 320 of the object 300, expressed from the view point shown in illustration (a) of FIG. 3, to an image of an area 330 corresponding to the area 320 of the object 300 expressed from the other view point shown in illustration (b) of FIG. 3. Here, the corresponding area 330 can be directly identified by a user or automatically identified by comparing pixel values of pixels forming the object 300 expressed from the certain view point (e.g., the view point of illustration (a) of FIG. 3) and pixel values of pixels forming the object 300 expressed from the other view point (e.g., the view point of illustration (b) of FIG. 3).

In more detail, in this example, the model generator 120 may scale the image of the corresponding area 330 so that a boundary of the area 320 and a boundary of the corresponding area 330 overlap, and then change the image of the area 320 to the scaled image of the corresponding area 330.

Illustration (c) of FIG. 3 shows a result of a changing of the image of the area 320 shown in illustration (a) of FIG. 3 to the image of the corresponding area 330 shown in illustration (b) of FIG. 3.

While generating a 3D model of the object 300 expressed from the view point shown in illustration (a) of FIG. 3, the model generator 120 may generate a 3D form of the object 300 based on the 2D image of illustration (a) of FIG. 3 and then put the 2D image of the object 300 shown in illustration (c) of FIG. 3 over the generated 3D form, instead of using the 2D image of FIG. 300 shown in illustration (a) of FIG. 3.

Figure 4A:
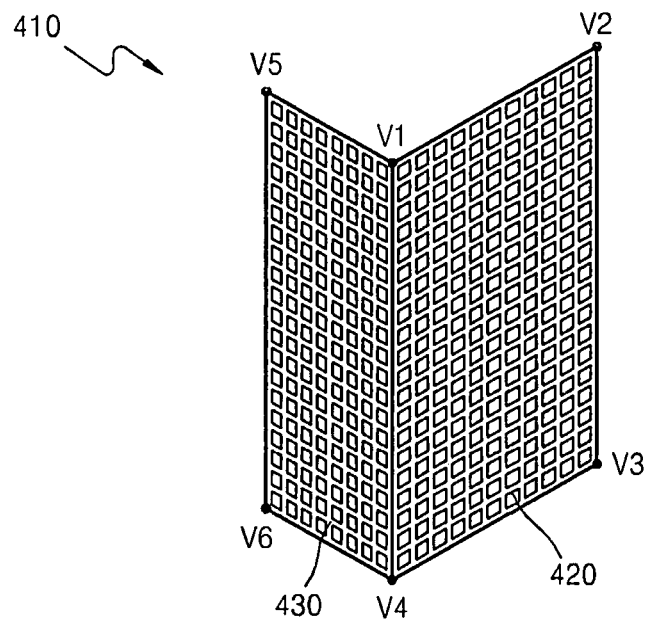
FIGS. 4A through 4C illustrate operations of a model matching unit, such as by the model matching unit illustrated in FIG. 1, according to an embodiment of the present invention.
Figure 4B:
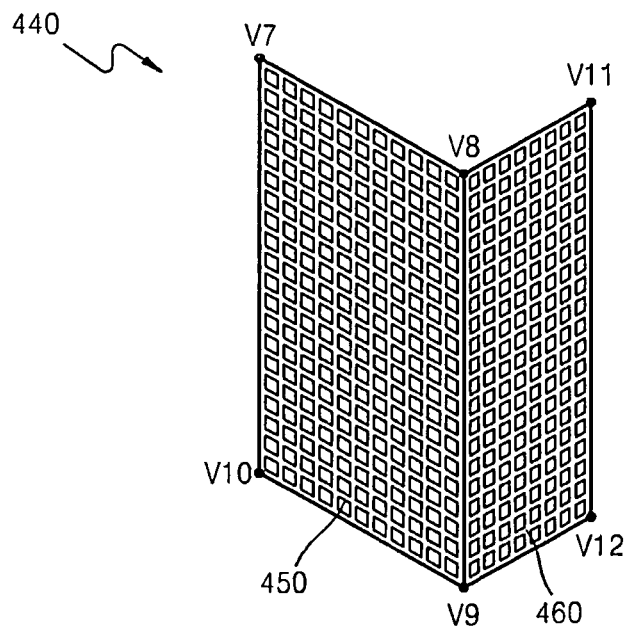
Figure 4C:
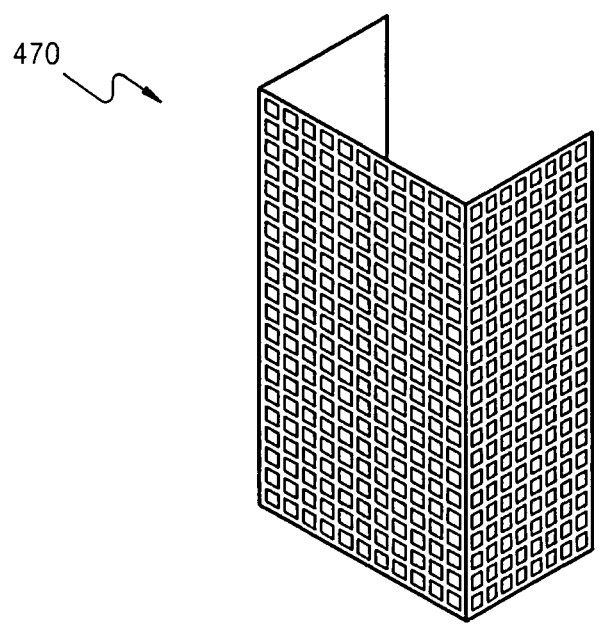

FIGS. 4A through 4C illustrate operations of a model matching unit, such as the model matching unit 130 illustrated in FIG. 1, according to an embodiment of the present invention.

FIG. 4A illustrates a 3D model 410 generated by modeling an object from a first example view point, FIG. 4B illustrates a 3D model 440 generated by modeling the object from a second example view point, and FIG. 4C illustrates a result 470 in which the 3D model 410 and the 3D model 440 have been matched/merged. Here, in this example, the object is a building having a plurality of windows.

The 3D model 410 and the 3D model 440 each shows different parts (i.e., portions) of the same 3D model, and thus the 3D model 410 and the 3D model 440 may be reconstructed as one 3D model 470.

Accordingly, in an embodiment, the model matching unit 130 may match the 3D model 410 and the 3D model 440 considering locations of the 3D model 410 and the 3D model 440. In detail, the model matching unit 130 may match the 3D model 410 and the 3D model 440 by considering relative locations of corresponding parts between the 3D model 410 and the 3D model 440. Here, in one embodiment, the corresponding parts may be directly appointed by a user, for example.

The corresponding parts between the 3D model 410 and the 3D model 440 may be a surface or vertices of the surface, for example. Referring to FIGS. 4A and 4B, corresponding surfaces of surfaces 420 and 430 of the 3D model 410 and surfaces 450 and 460 of the 3D model 440 are the surface 420 and the surface 450. The model matching unit 130 may, thus, match the 3D model 410 and the 3D model 440 by moving and scaling the 3D model 440 in a 3D space so that the surface 420 accurately corresponds to the surface 450 in the 3D space. Similarly, referring to FIGS. 4A and 4B, corresponding vertices of vertices V1, V2, V3, V4, V5, and V6 of the 3D model 410 and vertices V7, V8, V9, V10, V11, and V12 of the 3D model 440 are the vertices V1, V2, V3, and V4 and the vertices V7, V8, V9, and V10. The model matching unit 130 can match the 3D model 410 and the 3D model 440 by moving and scaling the 3D model 440 in the 3D space so that the vertices V1, V2, V3, and V4 respectively correspond to the vertices V7, V8, V9, and 10 in the 3D space.

Figure 5:
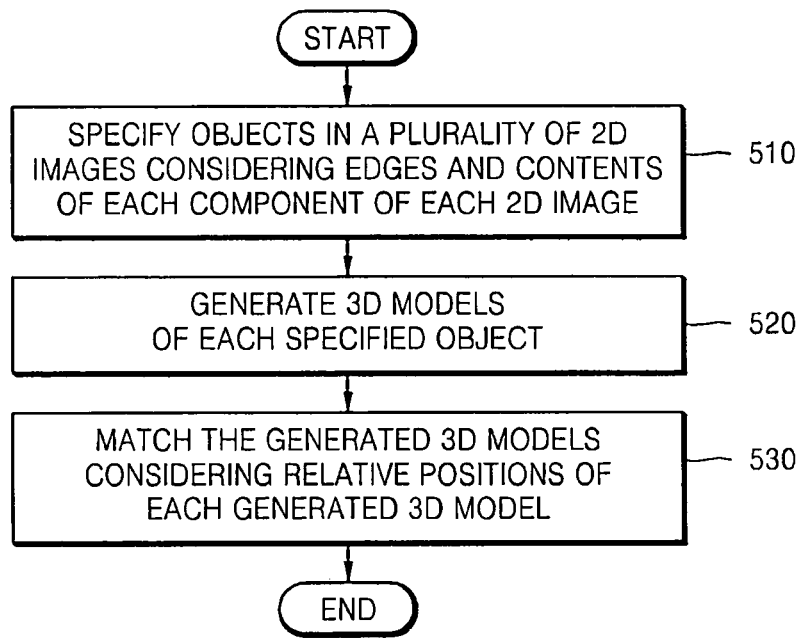
FIG. 5 illustrates a modeling method, according to an embodiment of the present invention.

FIG. 5 illustrates a modeling method, according to an embodiment of the present invention, with operations 510 through 530 generating a realistic 3D model of an object expressed in a 2D image.

In operation 510, objects from each of a plurality of 2D images expressed from different view points may be specified, e.g., by the pre-processor 110, considering an edge and contents of each component of the 2D image.

In operation 520, 3D models of each of the objects specified in operation 510 may be generated, e.g., by the model generator 120.

In operation 530, the 3D models generated in operation 520 may further be matched, e.g., by the model matching unit 130, by considering relative locations of the 3D models.

As described above, one or more embodiments of the present invention include a modeling method, medium, and system, for an image, e.g., a 2D image, where an object that is to be modeled in the 2D image is specified by considering the entire edges and contents of each component (e.g., a color component, a texture component, a 2D location component, and a 3D geometry component) of the 2D image. Accordingly, an object that is to be modeled in the image can be accurately specified. In detail, according to such a modeling method, medium, and system, an image, in which the edges are edges of an object from among several objects pre-prepared in a database and the contents of each component is contents of each component of the object prepared in the database, from the 2D image is specified as the object. Accordingly, the object in the 2D image may be accurately specified as an object that is to be modeled. For example, according to one or more embodiments of the present invention, in a 2D image expressing a road, for example, with a plurality of cars on the road, and a plurality of buildings closely standing in a row on both sides of the road, the road, each car, and each building can be accurately specified. In other words, without use of one or more embodiments of the present invention, the object may not be accurately specified, e.g., specifying a plurality of buildings as one building or specifying a car overlapping with a building as a part of the building. As such, in one or more embodiments of the present invention, such a modeling method, medium, and system can accurately generate a 3D model of an object that is to be modeled in an image, by accurately specifying the object in the 2D image and modeling the specified object.

In addition, one or more embodiments of the present invention include a modeling method, medium, and system specifying objects that are to be modeled from each of a plurality of 2D images expressing the objects from various view points, generating 3D models of the specified objects, and reconstructing the generated 3D models to one 3D model by considering relative locations of the generated 3D models. Accordingly, a 3D model, having information from various view points, instead of a 3D model having information from only a certain view point, can be generated. As such, here, the 3D model of the object that is to be modeled in the 2D image can be generated to have information from various view points, and thus a realistic 3D model of the object can be generated.

Moreover, when there are a plurality of objects that are to be modeled in an image, one or more embodiments of the present invention include a modeling method, medium, and system that can arrange generated 3D models of the objects in a 3D space so that relative locations of the objects are relative locations of the generated 3D models. Accordingly, when a location of one 3D model from among the generated 3D models is determined, locations of the remaining 3D models in the 3D space may be automatically determined, and thus the plurality of 3D models generated based on the 2D image can be easily and quickly arranged in the 3D space.

Meanwhile, one or more embodiments of the present invention include a method, medium, and system generating a 3D model of an object specified in a 2D image by generate a form of the 3D model of the object and putting/placing the 2D image from the specified object over the generated form. However, when another object overlaps a part of the specified object and thus a wrong 2D image may conventionally have been put over the generated form because an image of the other object would have been treated as an image of a part of the specified object, the modeling method, medium, and system can accurately generate color and texture of the 3D model of the specified object even when the another object overlaps the part of the specified object, by changing an image of an area of the specified object expressed from one view point to an image corresponding to the image of the area from among images of the specified object expressed from different view points.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A modeling method comprising:
   identifying a detected object in an input image according to a corresponding view point of the input image by comparing characteristic information of the detected object with characteristic information of each of plural pre-defined objects, where the comparing performs a comparing of generated color pixel value based image information of a group of pixels corresponding to a portion of the detected object with respective color pixel value based image information of a group of pixels of respective portions of each of the plural pre-defined objects in combination with a comparing of generated non-color pixel value based information of the group of pixels corresponding to the portion of the detected object with respective non-color pixel value based information of the group of pixels of the respective portions of each of the plural pre-defined objects for the identifying of the detected object;
   combining, as a combined 3D model, at least two respective 3D models, including a 3D model of the identified object from the view point of the input image, respectively from at least two different view points representing separate and/or overlapping portions of the identified object;
   using at least one processing device placing the input image including the identified object over the combined 3D model; and
   outputting the combined 3D model with the over-placed image.

2. The modeling method of claim 1, wherein each pre-defined object is represented by at least one pre-defined 3D model, and the method further comprises combining, as the combined 3D model, at least two respective 3D models based upon respective relationships with the identified object through different view points.

3. At least one non-transitory medium comprising computer readable code to control at least one processing element to implement the method of claim 1.

4. A modeling method generating a 3D model for an identified 2D object, comprising:
   determining whether the object in a first image of a first view point overlaps with another identified object in the first image;
   comparing, using at least one processing device, a portion of the first image corresponding to the object and a portion of a second image of a second view point including the object;
   modifying the first image to include a portion of the second image corresponding to the object, through modification of the portion of the second image for insertion into the first image to replace the corresponding portion of the first image including the object, based upon the determining indicating that the object in the first image overlaps with the other object in the first image, to modify the first image so the object in the first image does not overlap the other object in the first image; and
   placing the modified first image, using at least one processing device, over a select 3D model of the object corresponding to one or more view points.

5. The modeling method of claim 4, wherein the select 3D model is selected from a plurality of pre-defined 3D models based upon identified characteristics of the object.

6. The modeling method of claim 4, wherein the first view point is different from the second view point, and the modification of the portion of the second image includes view point modification of the portion of the second image to the first view point.

7. The modeling method of claim 4, further comprising combining, as a combined 3D model, at least two respective 3D models from at least two different view points representing separate and/or overlapping portions of the object and placing the modified first image over the combined 3D model.

8. At least one non-transitory medium comprising computer readable code to control at least one processing element to implement the method of claim 4.

9. A modeling method, comprising:
   identifying a detected object present in at least a first image of a first view point by comparing analyzed edges and/or contents of components of the first image with pre-defined edge and/or content information of plural pre-defined objects corresponding to one or more different view points, where the comparing performs a comparing of generated color pixel value based image information of a group of pixels corresponding to a portion of the detected object with respective color pixel value based image information of a group of pixels of respective portions of each of the plural pre-defined objects in combination with a comparing of generated non-color pixel value based information of the group of pixels corresponding to the portion of the detected object with respective non-color pixel value based information of the group of pixels of the respective portions of each of the plural pre-defined objects for identifying the detected object;
   generating a 3D model based upon results of the comparing of the analyzed edges and/or contents of components and based upon 3D positional information of the identified object in the first image and pre-defined 3D positional information of one or more of the plural pre-defined objects corresponding to the identified object; and
   placing, using at least one processing device, the first image over the generated 3D model.

10. The modeling method of claim 9, further comprising combining, as a combined 3D model, at least two respective 3D models from at least two different view points representing separate and/or overlapping portions of the identified object and placing the first image over the combined 3D model.

11. The modeling method of claim 9, further comprising arranging a plurality of generated 3D models of respective identified objects, including the generated 3D model, in a 3D space according to respective 3D positional information of each respective identified object so that relative locations between different identified objects in the first image, including the identified object, are relatively reflected in the 3D space.

12. The modeling method of claim 11, wherein the arranging of the plurality of generated 3D models includes merging generated 3D models that are determined to have same 3D positional information.

13. The modeling method of claim 9, further comprising:
   comparing the first image and a second image of a second view point;
   determining whether the identified object in the first image overlaps with another object in the first image;

modifying the first image to include a portion of the second image with reference to the identified object, as included in the second image, through modification of the portion of the second image and insertion into the first image to replace a corresponding portion of the first image, based upon the determining indicating that the identified object in the first image overlaps with the other object in the first image, to modify the first image so the object in the first image does not overlap the other object in the first image; and placing the modified first image over the generated 3D model.

14. The modeling method of claim 13, wherein the first view point is different from the second view point, and the modification of the portion of the second image includes at least view point modification of the portion of the second image to the first view point.

15. The modeling method of claim 9, further comprising:
comparing the first image and a second image of a second view point;
determining whether the identified object in the first image overlaps with another object in the first image;
modifying the first image to include a portion of the second image with reference to the identified object, as included in the second image, through modification of the portion of the second image and insertion into the first image to replace a corresponding portion of the first image, based upon the determining indicating that the identified object in the first image overlaps with the other object in the first image, to modify the first image so the object in the first image does not overlap the other object in the first image;
combining, as a combined 3D model, at least two respective 3D models from at least two different view points representing separate and/or overlapping portions of the identified object; and
placing the modified image over the combined 3D model.

16. At least one non-transitory medium comprising computer readable code to control at least one processing element to implement the method of claim 15.

17. The modeling method of claim 9, wherein the generating of the 3D model includes calculating depth values of pixels corresponding to the identified object.

18. The modeling method of claim 9, wherein the comparing of the analyzed edges and/or contents of components comprises comparing detected texture information in the first image respectively with pre-defined texture information of the plural pre-defined objects for identifying the detected object in the first image.

19. The modeling method of claim 9, wherein the comparing of the analyzed edges and/or contents of components comprises comparing detected edge information in the first image respectively with pre-defined edge information of the plural pre-defined objects for identifying the detected object in the first image.

20. The modeling method of claim 9, wherein the comparing of the analyzed edges and/or contents of components comprises comparing detected color component information in the first image respectively with pre-defined color component information of the plural pre-defined objects for identifying the detected object in the first image.

21. The modeling method of claim 9, wherein the comparing of the analyzed edges and/or contents of components comprises comparing detected location information in the first image respectively with pre-defined location information of the plural pre-defined objects for identifying the detected object in the first image.

22. The modeling method of claim 9, wherein the comparing of the analyzed edges and/or contents of components comprises converting the first image into multiple images, each representing differing information of the first image, including at least two of edge information, texture information, color information, location information, and/or 3D geometry information for the comparing with the edge and/or content information of the plural pre-defined objects.

23. The modeling method of claim 22, further comprising dividing the first image according to super pixels representing preset similarities between pixels for the converting of the first image into the multiple images.

24. At least one non-transitory medium comprising computer readable code to control at least one processing element to implement the method of claim 9.

25. A modeling system including at least one processing device, the system comprising:
an identification unit to identify a detected object in an input image according to a corresponding view point of the input image by comparing characteristic information of the detected object with characteristic information of each of plural pre-defined objects, where the comparing performs a comparing of generated color pixel value based image information of a group of pixels corresponding to a portion of the detected object with respective color pixel value based image information of a group of pixels of respective portions of each of the plural pre-defined objects in combination with a comparing of generated non-color pixel value based information of the group of pixels corresponding to the portion of the detected object with respective non-color pixel value based information of the group of pixels of the respective portions of each of the plural pre-defined objects for the identifying of the detected object;
a model matching unit to combine, as a combined 3D model, at least two respective 3D models, including a 3D model of the identified object from the view point of the input image, respectively from at least two different view points representing separate and/or overlapping portions of the identified object; and
an arranging unit, using the at least one processing device, to place the input image including the identified object over the combined 3D model.

26. The modeling system of claim 25, wherein each pre-defined object is represented by at least one pre-defined 3D model, such that the model matching unit combines, as the combined 3D model, at least two respective 3D models based upon respective relationships with the identified object through different view points.

27. A modeling system including at least one processing device, generating a 3D model for a 2D object, the system comprising:
a model generator to compare a first image of a first view point including the object and a second image of a second view point including the object, determining whether the object in the first image overlaps with another object in the first image, and modifying the first image to include a portion of the second image corresponding to the object through modification of the portion of the second image for insertion into the first image to replace a corresponding portion of the first image, based upon the determining indicating that the object in the first image overlaps with the other object in the first image, to modify the first image so the object in the first image does not overlap the other object in the first image; and an arranging unit, using the at least one processing device, to place the modified first image over a select 3D model of the object corresponding to one or more view points.

28. The modeling system of claim 27, wherein the select 3D model is selected by an identification unit from a plurality of pre-defined 3D models based upon identified characteristics of the object.

29. The modeling system of claim 27, wherein the first view point is different from the second view point, and the modification of the portion of the second image includes at least view point modification of the portion of the second image to the first view point.

30. The modeling system of claim 27, further comprising a model matching unit to combine, as a combined 3D model, at least two respective 3D models from at least two different view points representing separate and/or overlapping portions of the object, such that the arranging unit places the modified first image over the combined 3D model.

31. A modeling system including at least one processing device, the system comprising:
an object identification unit to identify a detected object present in at least a first image of a first view point by comparing analyzed edges and/or contents of components of the first image with respective pre-defined edge and/or content information for each of plural pre-defined objects, obtained from an object storage arrangement configured for enabling an identifying of which of the plural pre-defined objects is specified for respective plural detected objects of input images of one or more view points;
a model generator to generate a 3D model based upon results of the comparing of the analyzed edges and/or contents of components and based upon 3D positional information of the identified object in the first image and pre-defined 3D positional information of one or more of the plural pre-defined objects corresponding to the identified object; and
an arranging unit, using the at least one processing device, to place the first image over the generated 3D model.

32. The modeling system of claim 31, further comprising a model matching unit to combine, as a combined 3D model, at least two respective 3D models from at least two different view points representing separate and/or overlapping portions of the identified object,
wherein the arranging unit places the first image over a corresponding combined 3D model.

33. The modeling system of claim 31, wherein the arranging unit arranges a plurality of generated 3D models of respective identified objects, including the generated 3D model, in a 3D space according to respective 3D positional information of each respective identified object so that relative locations between different identified objects in the first image, including the identified object, are relatively reflected in the 3D space.

34. The modeling system of claim 33, wherein the arranging of the plurality of generated 3D models includes merging generated 3D models that are determined to have same 3D positional information.

35. The modeling system of claim 31, wherein the model generator further compares the first image and a second image of a second view point, determines whether the identified object in the first image overlaps with another object in the first image, and modifies the first image to include a portion of the second image with reference to the identified object, as included in the second image, through modification of the portion of the second image for insertion into the first image to replace a corresponding portion of the first image, based upon the determining indicating that the identified object in the first image overlaps with the other object in the first image, to modify the first image so the object in the first image does not overlap the other object in the first image,
wherein the arranging unit places the modified first image over the generated 3D model.

36. The modeling system of claim 35, wherein the first view point is different from the second view point, and the modification of the portion of the second image includes at least view point modification of the portion of the second image to the first view point.

37. The modeling system of claim 31, wherein the model generator compares the first image and a second image of a second view point, determines whether the identified object in the first image overlaps with another object in the first image, and modifies the first image to include a portion of the second image with reference to the identified object, as included in the second image, through modification of the portion of the second image for insertion into the first image to replace a corresponding portion of the first image, based upon the determining indicating that the identified object in the first image overlaps with the other object in the first image, to modify the first image so the object in the first image does not overlap the other object in the first image, and the system further comprises:
a model matching unit to combine, as a combined 3D model, at least two respective 3D models from at least two different view points representing separate and/or overlapping portions of the identified object,
wherein the arranging unit places the modified image over the combined 3D model.

38. The modeling system of claim 31, wherein the arranging unit generates the 3D model by at least calculating depth values of pixels corresponding to the identified object.

39. The modeling system of claim 31, wherein the comparing of the analyzed edges and/or contents of components comprises comparing detected texture information in the first image respectively with pre-defined texture information of the plural pre-defined objects for identifying the detected object in the first image.

40. The modeling system of claim 31, wherein the comparing of the analyzed edges and/or contents of components comprises comparing detected edge information in the first image respectively with pre-defined edge information of the plural pre-defined objects for identifying the detected object in the first image.

41. The modeling system of claim 31, wherein the comparing of the analyzed edges and/or contents of components comprises comparing detected color component information in the first image respectively with pre-defined color component information of the plural pre-defined objects for identifying the detected object in the first image.

42. The modeling system of claim 31, wherein the comparing of the analyzed edges and/or contents of components comprises comparing detected location information in the first image respectively with pre-defined location information of the plural pre-defined objects for identifying the detected object in the first image.

43. The modeling system of claim 31, wherein the comparing of the analyzed edges and/or contents of components comprises converting the first image into multiple images, each representing differing information of the first image, including at least two of edge information, texture information, color information, location information, and/or 3D geometry information for the comparing with the edge and/or content information of the plural pre-defined objects.

44. The modeling system of claim 43, wherein the comparing of the analyzed edges and/or contents of components further comprises dividing the first image according to super pixels representing preset similarities between pixels for the converting of the first image into the multiple images.

* * * * *